(12) United States Patent
Cohen et al.

(10) Patent No.: US 9,189,139 B2
(45) Date of Patent: Nov. 17, 2015

(54) LIKELIHOOD-BASED PERSONALIZED NAVIGATION SYSTEM AND METHOD

(71) Applicant: LinkedIn Corporation, Mountain View, CA (US)

(72) Inventors: Tomer Cohen, Mountain View, CA (US); Leah M. M. McGuire, Redwood City, CA (US); Akhilesh Gupta, Los Altos, CA (US); Kiran Prasad, Santa Clara, CA (US)

(73) Assignee: LinkedIn Corporation, Mountain View, CA (US)

( * ) Notice: Subject to any disclaimer, the term of this patent is extended or adjusted under 35 U.S.C. 154(b) by 165 days.

(21) Appl. No.: 13/901,380

(22) Filed: May 23, 2013

(65) Prior Publication Data

US 2014/0298203 A1    Oct. 2, 2014

Related U.S. Application Data

(63) Continuation-in-part of application No. 13/853,948, filed on Mar. 29, 2013.

(60) Provisional application No. 61/806,221, filed on Mar. 28, 2013.

(51) Int. Cl.
*G06F 3/0484* (2013.01)
*G06F 3/0481* (2013.01)

(52) U.S. Cl.
CPC .......... *G06F 3/04847* (2013.01); *G06F 3/0481* (2013.01)

(58) Field of Classification Search
CPC ................................ G06F 3/481; G06F 3/0482
See application file for complete search history.

(56) References Cited

U.S. PATENT DOCUMENTS

| | | | |
|---|---|---|---|
| 6,377,286 B1 * | 4/2002 | Hochmuth | G06F 3/04817 715/810 |
| 7,134,094 B2 * | 11/2006 | Stabb et al. | 715/827 |
| 8,452,797 B1 * | 5/2013 | Paleja et al. | 707/767 |
| 2007/0094616 A1 * | 4/2007 | Won | G06F 3/0238 715/847 |
| 2008/0046840 A1 * | 2/2008 | Melton et al. | 715/825 |
| 2008/0155428 A1 * | 6/2008 | Lee | G06F 3/0482 715/745 |
| 2009/0017873 A1 * | 1/2009 | Muramatsu | H04M 1/72586 455/566 |
| 2009/0144665 A1 * | 6/2009 | Bernstein | G06F 3/0482 715/853 |
| 2010/0050128 A1 * | 2/2010 | Chiang et al. | 715/847 |
| 2011/0072492 A1 * | 3/2011 | Mohler et al. | 726/3 |
| 2011/0298701 A1 * | 12/2011 | Holzer | G06Q 90/00 345/156 |
| 2012/0210240 A1 * | 8/2012 | Neystadt | G06Q 30/0282 715/739 |
| 2013/0339901 A1 * | 12/2013 | Kirkham et al. | 715/810 |

* cited by examiner

*Primary Examiner* — Phenuel Salomon
(74) *Attorney, Agent, or Firm* — Schwegman Lundberg & Woessner, P.A.

(57) ABSTRACT

A system may be configured to provide a user interface on a mobile device for a social network having a plurality of functions. The system may include a display, configured to display a representation of each of a subset of the plurality of functions, wherein each function of the subset is implementable upon selection of a representation corresponding to the function by a user and a processor, configured to dynamically generate the subset of the plurality of functions based, at least in part, on a likelihood for each of the functions that the user will select a corresponding representation. The display may be configured to display the subset as dynamically generated.

22 Claims, 8 Drawing Sheets

LIKELIHOOD-BASED PERSONALIZED NAVIGATION SYSTEM AND METHOD

PRIORITY

This application claims the benefit of priority to U.S. Provisional Application No. 61/806,221, filed Mar. 28, 2013, titled "USER INTERFACE FOR PERSONALIZED NAVIGATION", which is incorporated herein in its entirety.

This application is a continuation-in-part under 35 U.S.C. 120 of U.S. patent application Ser. No. 13/853,948, filed Mar. 29, 2013, titled "Providing a Personalized Navigation Experience in a Mobile Application", which is incorporated herein in its entirety.

TECHNICAL FIELD

The subject matter disclosed herein generally relates to a personalized user interface.

BACKGROUND

Contemporary social networks display content from a variety of sources. Member profiles, user messages and comments, information from groups and companies, advertisements, and the like may combine to create the overall content that constitutes at least some of the content that may be displayed on a user interface to users of the social network. Certain types of content may tend to be accessed by various users more or less frequently than by other users.

BRIEF DESCRIPTION OF THE DRAWINGS

Some embodiments are illustrated by way of example and not limitation in the figures of the accompanying drawings.

DETAILED DESCRIPTION

Figure 1:
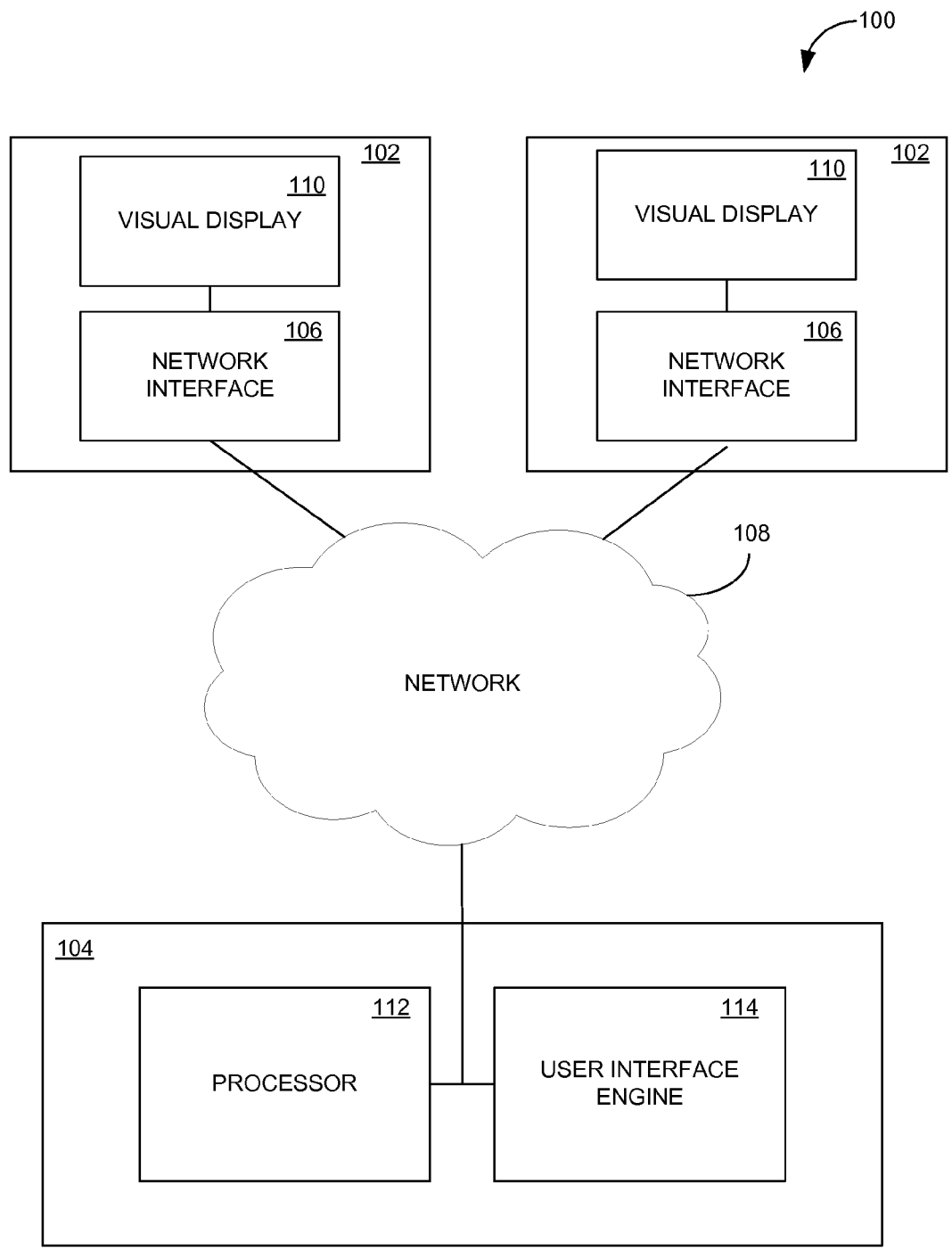
FIG. 1 is a block diagram of a system including user devices and a social network server.

Example methods and systems are directed to the generation of a personalized navigation system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Functions related to social networks may be provided to users of the social network according to a variety of different formats. Such functions may include the display of news and other information, personal and/or professional information related to members of the social network, information related to groups and organizations associated with the social network, messages between members of the social network, and updates related to activities and uses of the social network. For instance, information displayed on a user device having a relatively large visual display, such as a personal computer, a table computer, and so forth, may provide relatively substantial amounts of information on a single screen, such as a home screen. Such home screens may include social network information as well as a variety of menus and links to screens related to specific types of content. For instance, a representation of a function, such as an icon, link, or other visual representation of the function, may be displayed that allows the function to be accessed, such as by opening a new webpage or starting an application. Owing to the large display area, relatively large amounts of information may be displayed without creating undue clutter and/or confusion on the part of the user.

By contrast, functions or representations of functions displayed on relatively small visual displays, such as on mobile devices including smartphones, personal digital assistants (PDA), and the like, may be relatively constricted. Placing large amounts of information on a small screen may lead to difficulty on the part of users in finding and accessing information or functions that they are seeking and/or may result in relatively poor visual aesthetics. Consequently, it may be relatively more significant to determine what kind of information, menus, and/or links should be displayed on user devices that conventionally have relatively small visual displays than may be the case for user devices that conventionally have relatively large visual displays. However, it is to be understood that the principles that may be applied to the organization and display of information, menus, and links on a small screen may be applied to large displays so as to result in similar organizational and aesthetic advantages.

A social network user interface has been developed along with a process for providing the user interface on user devices. The user interface may be primarily adapted for display on a mobile device but may be applied equally well to user devices with relatively large visual displays. The user interface may incorporate the ability of a user to select individual functions of the social network. Certain of the functions and/or representations of functions displayed on the user interface for selection by the user may be presented without respect to user interaction with the social network, such as certain core functions that are displayed on the user interface of some or all of the users of the social network. Conversely, certain of the functions and/or representations of functions may be dynamically displayed on the user interface based on user interaction with the social network. The process for providing the user interface may take note of user interaction with the social network, such as what functions the user either utilizes the most or has deliberately selected for display on the user interface, and display those functions accordingly based on predefined rules. Consequently, the user interface may provide both static functions to all or a group users and dynamic functions based on the conduct and preferences of the individual users to which the user interface is provided.

FIG. 1 is a block diagram of a system 100 including user devices 102 and a social network server 104. User devices 102 may be a personal computer, netbook, electronic notebook, smartphone, PDA, or any electronic device known in the art that is configured to display web pages. The user devices 102 may include a network interface 106 that is or may be communicatively coupled to a network 108, such as the Internet, and a visual display 110 configured to display a user interface as disclosed herein.

The social network server 104 may be communicatively coupled to the network 108. The server 104 may be an individual server or a cluster of servers, and may be configured to perform activities related to serving the social network, such as storing social network information, processing social network information according to scripts and software applications, transmitting information to present social network information to users of the social network, and receive information from users of the social network. The server 104 may include one or more electronic data storage devices, such as a hard drive, and may include a processor 112. The social network server 104 may store information related to members of the social network. For instance, for an individual person, the member's information may include name, age, gender, profession, location, activities, likes and dislikes, and so forth. For an organization, such as a company, the information may include name, offered products for sale, available job postings, organizational interests, forthcoming activities, and the like.

The server 104 includes a user interface engine 114. The user interface engine 114 may include or be provisioned by the processor 112 and electronic storage devices of the server 104. The user interface engine 114 may generate a user interface that may be unique to each user and/or user device 102 of the social network 100.

Figure 2:
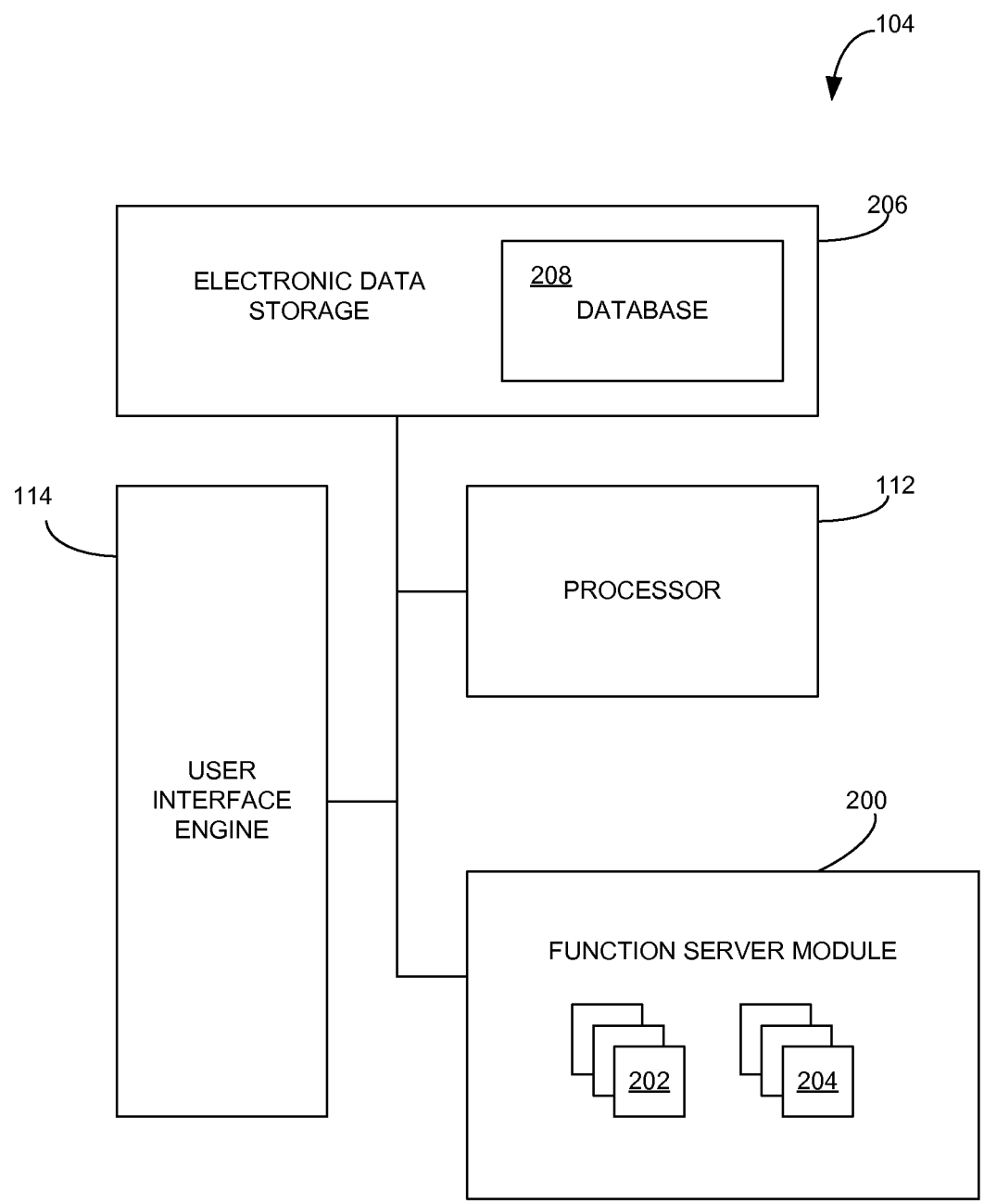
FIG. 2 is a block diagram illustrating various components of a social networking server with a user interface engine.

FIG. 2 is a block diagram illustrating various components of a social networking server 104 with the user interface engine 114. In an example, the social networking server 104 is based on a three-tiered architecture, consisting of a front-end layer, application logic layer, and data layer. As is understood by skilled artisans in the relevant computer and Internet-related arts, each module or engine shown in FIG. 2 may represent a set of executable software instructions and the corresponding hardware (e.g., memory and processor) for executing the instructions. To avoid obscuring the subject matter with unnecessary detail, various functional modules and engines that are not germane to conveying an understanding of the inventive subject matter have been omitted from FIG. 2. However, a skilled artisan will readily recognize that various additional functional modules and engines may be used with a social networking server 104 such as that illustrated in FIG. 2, to facilitate additional functionality that is not specifically described herein. Furthermore, the various functional modules and engines depicted in FIG. 2 may reside on a single server computer, or may be distributed across several server computers in various arrangements.

The front end of the social network server 104 consists of the user interface engine (e.g., a web server) 114, which receives requests from various client computing devices, and communicates appropriate responses to the requesting client devices. For example, the user interface module(s) 114 may receive requests in the form of Hypertext Transport Protocol (HTTP) requests, or other web-based, application programming interface (API) requests. The application logic layer includes various function server modules 200, which, in conjunction with the user interface engine(s) 114, generates various user interfaces (e.g., web pages) with data retrieved from various data sources in the data layer. With some embodiments, individual function server modules 200 are used to implement the functionality associated with various first functions 202 and second functions 204 of the system 100. As will be discussed in detail herein, the first functions 202 may be configured to be statically displayed on a visual display 110 while the second functions 204 may be configured to be dynamically displayed on the visual display 100. An ability to identify second functions 204 that may be dynamically displayed on a visual display 110 of a user device 102 of a particular user may be a service implemented in an independent function server module 200.

The data layer may include electronic data storage 206 that includes one or more databases 208, such as a database 208 for storing user data, such as user characteristics, and information related to social network functions 202, 204, such as interest groups, companies, advertisements, events, news, discussions, text posts, short form posts, questions and answers, and so forth accessed by each user. The social network information may include a date and time at which particular social network functions 202, 204 were accessed or otherwise utilized by the user. In some examples, the user interface engine 114 operates in the background (e.g., in an "offline" configuration without the need to access the network 108) based on information already stored in the database 208.

In various examples, when a person initially registers to become a member of the system 100, the person may optionally be prompted to provide some personal information, such as his or her name, age (such as by birth date), gender, interests, contact information, home town, address, the names of the member's spouse and/or family users, educational background (such as schools, majors, etc.), employment history, skills, professional organizations, and so on. This information may be stored, for example, in the database 208.

Once registered, a member may invite other users, or be invited by other users, to connect via the system 100. A "connection" may involve a bi-lateral agreement by the users, such that both users acknowledge the establishment of the connection. Similarly, with some embodiments, a user may elect to "follow" another user. In contrast to establishing a "connection", the concept of "following" another user typically is a unilateral operation, in some examples, does not require acknowledgement or approval by the user that is being followed. When one user follows another, the user who is following may receive automatic notifications about various activities undertaken by the user being followed.

The system 100 may provide a broad range of other functions 202, 204 that allow user the opportunity to share and receive information, often customized to the interests of the user. In some examples, the system 100 may include a photo sharing application that allows users to upload and share photos with other users. In some examples, users may be able to self-organize into groups, or interest groups, organized around a subject matter or topic of interest. With some embodiments, users may subscribe to or join groups affiliated with one or more companies. For instance, with some embodiments, users of the system 100 may indicate an affiliation with a company at which they are employed, such that news and events pertaining to the company are automatically communicated to the users. In some examples, users may be allowed to subscribe to receive information concerning companies other than the company with which they are employed.

In various examples, the user interface engine 114, such as in conjunction with the function server module 200 and based on information from the database 208, may generate a user interface unique to each user of the system 100. The user interface, as disclosed herein, may include representations of first functions 202 of the social network that are displayed without respect to the way in which the particular user of the social network actually utilizes the social network. Such representations of first functions 202 may, in various examples, be static with respect to some or all users of the social network. The user interface may further include representations of second functions 204 that are dynamically provided to the individual user of the social network based on prior user interaction with the social network, such as may be recorded in the database 208. The second functions 204 may be provided dynamically based on a likelihood that the user will select the functions.

Figure 3:
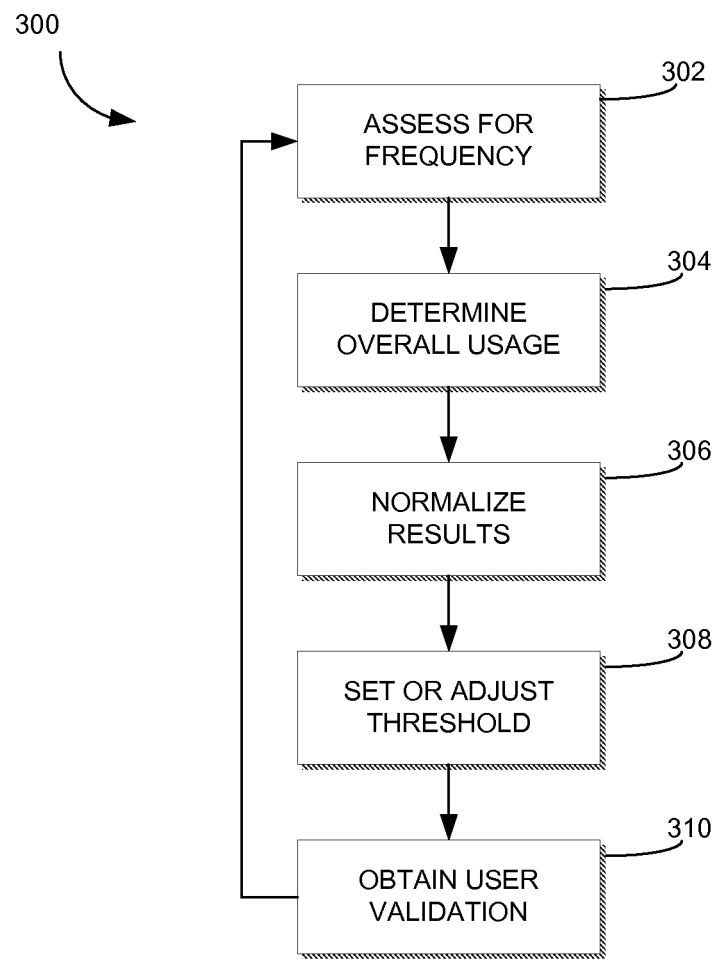
FIG. 3 is a flowchart for running a process.

FIG. 3 is a flowchart for running a process 300. In an example, the user interface engine 114 or other suitable componentry of the system 100 or other suitable device or system may generate the dynamically-generated function representations based on the process 300 that includes multiple aspects of the user's prior interaction with the social network. The process 300 may ultimately identify those functions 204 that the individual user is most likely to select or to want to select among a larger population of possible functions 204 to select. Functions 204 among the larger population of possible functions that are deemed relatively less likely to be selected may not be displayed on the user interface.

At 302, for a user of the social network, a filter of one or more functions 204 may be assessed for frequency or "pulse" with which the user has accessed a particular function 204 in the past. The frequency may be over a predetermined time period, such as a preceding three-month time period. In an example, the functions 204 may be filtered based on meeting a frequency threshold.

At 304, for the user, the overall usage or "amplitude" may be determined by summing a number of uses of the function 204 and the number of actions every time the function 204 is used. In an example, the functions 204 that first pass the second threshold may be considered for overall usage. In an example, a threshold may be applied for overall usage.

At 306, the results for frequency and overall usage are normalized based on expected frequency, with functions 204 that are expected to have high use normalized down and functions 204 that are expected to have low use normalized up. For instance, a function that displays news updates may be expected to be visited at least daily, while a function that displays job postings may be expected to be visited weekly. Thus, the frequency of a user who visits the updates function daily may be normalized to be the same as the frequency of a user who visits the jobs function weekly. Normalization may be equally applicable to overall usage or "amplitude", in that an overall usage of an update function may be expected to involve dozens of user selections of or interactions with news items while usage of a jobs posting function may be expected to involve two to four user selections or interactions.

At 308, a threshold for adding representations of functions (see below) may be set or adjusted. In various examples, to add a function 204 to a user interface may require a certain minimum usage threshold for the function 204. For instance, a user may need to access the function 204 at least once per week in order to pass the threshold to add the function 204 to the user interface. Additional or alternative thresholds are contemplated. Further, the same or a different threshold may be applied to remove a function 204 from the user interface. For instance, while a function 204 may be added based on a threshold of one use per week, a function 204 may be removed from the user interface based on being used less frequently than once per month. Alternative removal thresholds are contemplated.

In various examples, the threshold may serve in place of normalization at 306. In an example, the threshold may be set us that an access of the function 204 in each of three consecutive predetermined time periods or intervals or on seven days over a period of six predetermined time periods or intervals. In such an example, the threshold may be low enough that normalization may be superfluous. In various examples, however, normalization is utilized notwithstanding a relatively low threshold.

At 310, a user validation may be obtained from a selection box (see below), upon which a representation may be added to a function selection screen (see below). Alternatively, the representation may be added without respect to a user validation. The process 300 may then return to assessing for frequency 302, providing a feedback loop for updating the functions 204 presented on the user interface based on use of the social network.

Figure 4:
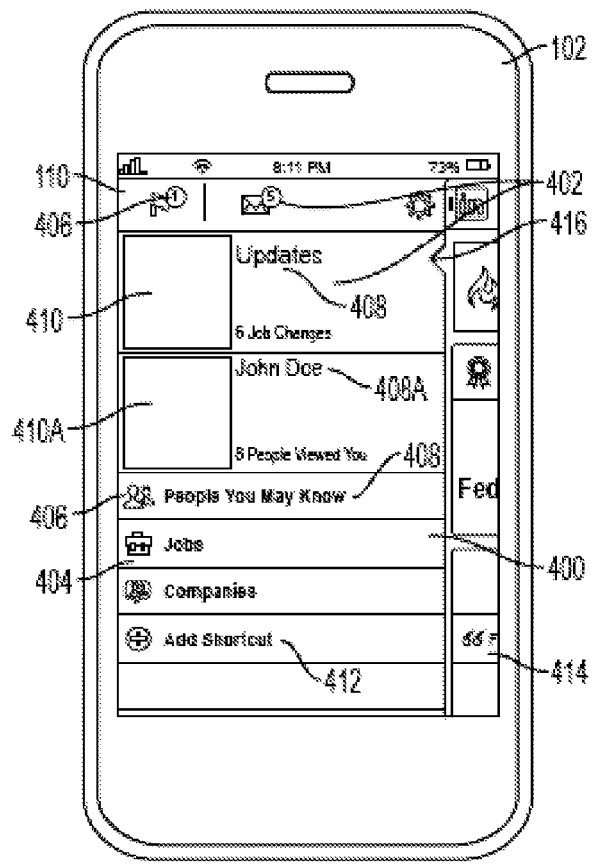
FIG. 4 is a depiction of a user device having a visual display displaying a function selections screen of a user interface.

FIG. 4 is a depiction of a user device 102, as illustrated a smartphone, having a visual display 110 displaying a function selections screen 400 of a user interface according to the disclosure herein. The function selection screen 400 includes first representations 402 of first functions 202 and second representations 404 of second functions 204. The first representations 402 include icons 406, text 408, and photographic or graphic images 410. Such graphic images may include logos and the like, while icons 406 may be generic symbols. Various icons 406, text 408, and images 410 correspond to a single function. For instance, a first representation 402 or a second representation 404 may include both text 408A and an image 410A to denote a single first function 202 or second function 204, respectively.

The first representations 402 and the second representations 404 are selectable by a user of the user device 102 to select a corresponding first or second function 202, 204, as appropriate. For instance, where the user device 102 includes a touchscreen, the user may tap the touchscreen on or proximate the representation 402, 404 to access the corresponding function 202, 204. Other selection mechanisms known in the art may be utilized, such as with a mouse and cursor.

The first representations 402 may be displayed on the function selections screen 400 without respect to interaction by the user with first functions 202 of the social network. Thus, the process 300 with respect to the frequency, amplitude, threshold, and so forth described in detail herein may not be utilized with respect to the first representations 402. Rather, the first representations 402 may be static on the function selections screen 400 and may be displayed without respect to actions by the user. Such first functions 202 may include functions such as notifications, messages, updates, and a profile of the user.

The second representations 404 may be displayed dynamically on the function selections screen 400 based on the use of the social network by the user and the process 300. As noted above, such second functions 204 may be functions 204 that are relatively likely to be selected by the user or are functions 204 that the user may be relatively likely to want to select. In the illustrated example, the second functions 204 are "People You May Know", jobs, and companies.

The user of the social network may, in certain examples, be enabled to change the screen position of the second representations 404. For instance, a user may select one or more of the second representations 404 for repositioning by holding a select command on the second representation 404 for, for instance, two (2) or more seconds, whereupon the second representation 404 may be repositionable. Upon becoming repositionable, the second representation 404 may be dragged-and-dropped to its preferred position. The user interface engine 114 may note the change in location of the second representation 404 and save the setting.

The function selections screen 400 further includes a selection representation 412 for the user to select one or more of the second representations 404 for display on the function selections screen 400. By selecting the "Add Shortcut" representation 412, the user may be presented with a list of second functions 204 that may be added among the second representations 404. In various examples, if a user adds a particular second function 204, the representation 404 corresponding to the second function 204 as added is displayed on the function selections screen 400, while representations 404 corresponding to other functions 204, such as those corresponding to functions 204 selected by way of the process 300, may be removed from the function selections screen 400.

Alternatively or additionally, the second functions 204 may be weighted and corresponding representations 404 displayed on the function selections screen 400 accordingly. In an example, each second function 204 is weighted according to whether the second function 204 was added by the user by way of the representation 412. In an example, a function 204 added by the user may be weighted relatively highly while a function 204 not added by the user may be weighted relatively lowly. The weight may be applied against the likelihood as determined by the process 300. Thus, a representation 404 of a function 204 with a low likelihood of being selected according to the process 300 may nevertheless be displayed on the function selections screen 400 if the user has added the function 204 using the adding representation 412. By contrast, a representation 404 of a function 204 with a relatively high likelihood as determined by the process 300 may not be displayed on the function selections screen 400 if the user has added several other functions 204 already.

The weight of a function 204 added with the representation 412 may be a decaying weight. In other words, the weight may be high initially, but if the user does not subsequently utilize the function 204 after the corresponding representation 404 has be added on the function selections screen 400, the weight may decline so that another second function 204 with a higher likelihood may ultimately replace the previously added second function 204 with the lower likelihood. In that way, after a period of time, such as several weeks, a function 204 that was added to the function selections screen 400 by a user but then not subsequently heavily utilized may ultimately be replaced notwithstanding the user having deliberately added the function 204. It is noted that reducing the weight does not inherently remove a function 204 and corresponding representation 404. Rather, reducing weight may merely increase a likelihood that another function 204 will eventually replace the function 204 in question.

The function selections screen 400 further includes a slide screen 414 that corresponds to one of the functions 202, 204. As illustrated, the slide screen 414 corresponds to the updates function representation 402A as denoted by the arrow 416. The slide screen 414 may show a currently active function 202, 204, while the functions displayed on the function selections screen 400 may be functions 202, 204 that are either the currently active function or functions 202, 204 that may be activated by the user as disclosed herein.

Figure 5:
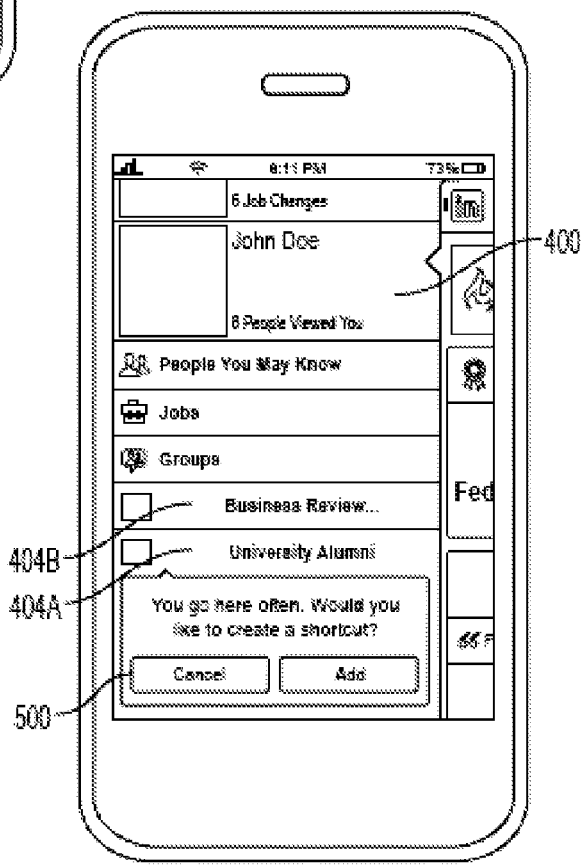
FIG. 5 is an image of an example of the function selections screen prompting the user whether to add a particular second representation.

FIG. 5 is an image of an example of the function selections screen 400 prompting the user whether to add a particular second representation 404A. The second representation 404A corresponds to a second function 204 that has been identified as having a high likelihood by the process 300 disclosed herein. However, rather than automatically placing the second representation 404A on the user interface, the second representation 404A is displayed provisionally and a selection box 500 is displayed to allow a user to add or cancel the addition of the second representation 404A.

As illustrated, the selection box 500 includes a prompt for adding the shortcut in which the user is asked if the user would like to add the second representation 404A. Alternatively, the selection box 500 may be a ratification for a second representation 404A that has already been added. In such an example, the selection box 500 may display text such as "You use [function X] often and a shortcut has been added. Would you like to keep the shortcut?" and allow the user to select to keep or not keep the shortcut. Further alternatively, a second representation 404A may be added and, rather than providing a selection for the user, a user may simply receive a text notification, such as in a box similar to the selection box 500, notifying the user of the addition of the second representation 404A but not providing a selection to approve or reject the addition of the second representation 404A. Further alternatively, a user may not be notified of the second representation 404A.

As illustrated in FIG. 5, the second representations 404 include both category or "branch" representations 404B and individual or "leaf" representations 404C. Category representations 404B may correspond to multiple individual functions 204. Thus, the "Groups" representation 404B may lead to a page that shows multiple individual groups. By contrast, the "Business Review" representation 404C may pertain to a specific, individual group by that name.

Figure 6A:
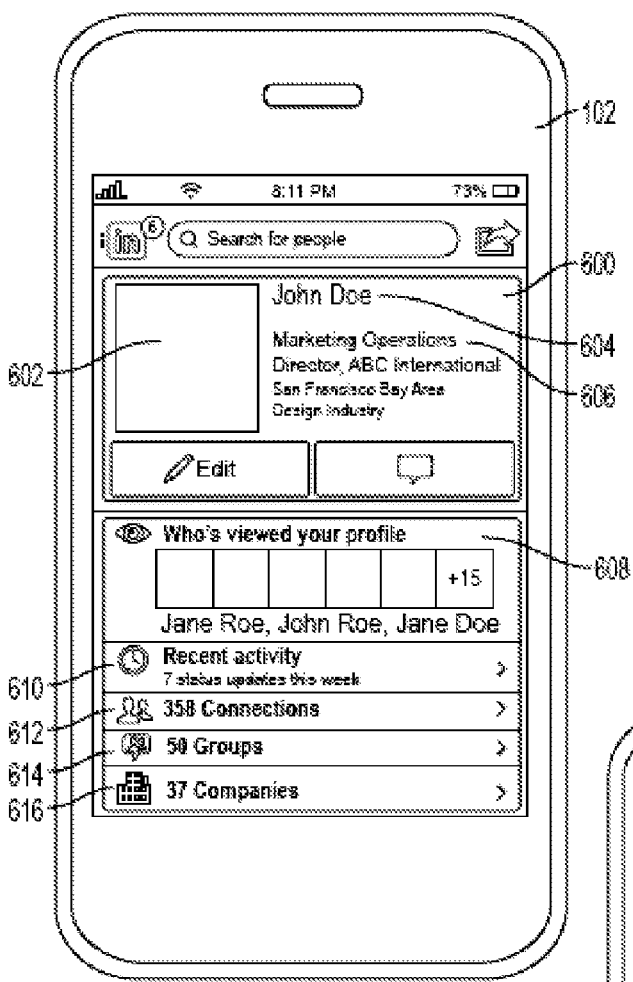
FIGS. 6A and 6B are function implementation screens.

FIG. 6A is a function 202, 204 implementation screen, in this case a user profile screen 600 showing the user profile function as is selectable from the corresponding first representation 402 on the function selections screen 400. As illustrated, the user profile screen 600 includes an image 602 of the user, a name 604, a job 606, users who have viewed the user's profile 608, recent activity by the user 610, user connections 612, user groups 614, and user companies 616.

Figure 6B:
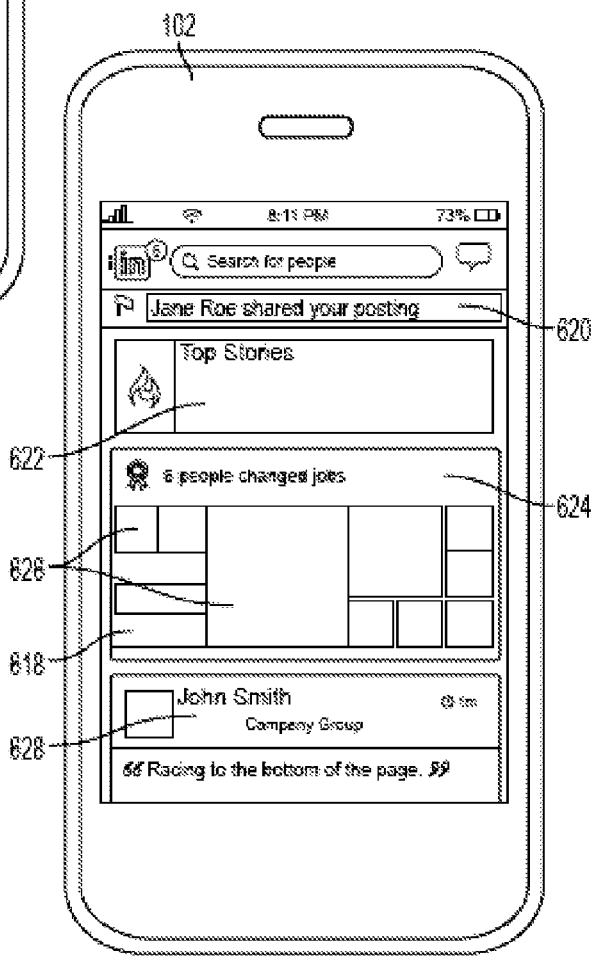

FIG. 6B is a function implementation screen, in this case an updates screen 618 showing updates as is selectable from the corresponding first representation 402 on the function selections screen 400. The updates screen 618 as illustrated includes an update 620, top stories 622, a first notification 624 with associated images 626, and a second notification 628 with an associated user 630.

The associated images 626 may be static and display a permanent or semi-permanent image associated with the notifications 624. For instance, an image 626 associated with a notification 624 related to a particular person or company may be an image of the person or the company's logo, respectively. While such an image 626 may change from time to time, the image 626 may not be expected to update without refreshing the function implementation screen.

By contrast, the image 626 may be a "live" image that may incorporate information related to the notification 624 that may include animation or information that regularly changes or updates. A changing image 626 may provide "teasers" for associated content, such as by stepping or rotating through images of people associated with a notification 624. Additionally or alternatively, a changing image 626 may change based on changes to the associated notification 624. For instance, if the notification 624 is related to a location, the image 626 may update regularly based on a change in the location without having to update the function implementation screen as a whole. In various examples, live images may be applied to any image or graphic displayed on the user device 102 with respect to the social network. For instance, the image 410 of the updates representation 402 of FIG. 4 may include "teasers" for the content that may be arrived at in the updates screen 618, such as by rotating through the images 626 that are ultimately displayed on the update screen 618.

Figure 7:
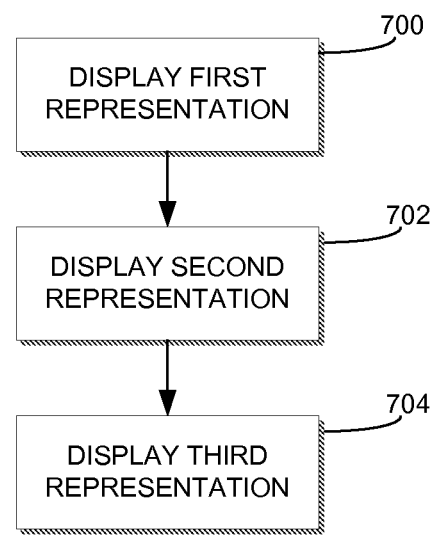
FIG. 7 is a flowchart for generating a user interface, such as for a mobile device.

FIG. 7 is a flowchart for generating a user interface, such as for a mobile device.

At 700, a first representation of a first function of the plurality of functions is displayed, the first representation being selectable by a user to implement the first function, the first representation being displayed on the function selection screen without respect to a user interaction with the social network. In an example, the first representation is fixedly positioned on the function selections screen.

At 702, a second representation of a second function of the plurality of functions is displayed, the second representation being selectable by the user to implement the second function, the second representation being dynamically displayed on the function selection screen based on a likelihood of the user to select the second representation. In an example, the likelihood is based, at least in part, on a prior interaction by the user with the social network. In an example, the prior interaction with the social network is via at least one of the user interface for the mobile device and a user interface for a computer, the user interface for the mobile device being different than the user interface for the computer. In an example, the user interface for the mobile device has a first display area and the user interface for the computer has a second display area larger than the first display area. In an example, the likelihood is based, at least in part, on a prior interaction by a second user with the social network.

At 704, a third representation of a third function of the plurality of functions is displayed, the third representation being selectable by the user to implement the third function, the third representation being dynamically displayed on the function selection screen based on a command by the user. In an example, the third representation is dynamically displayed further based on a likelihood of the user to select the third representation. In an example, the second representation and the third representation are positionable on the function selection screen with respect to one another. In an example, the second and third representations are positionable based on a relative likelihood of the user to select the second and third representations. In an example, the second and third representations are positionable based on a user command.

In an example, the third representation of the third function is selectable by the user to implement the third function, the third representation being dynamically displayed on the function selection screen based on a likelihood of the user to select the third representation. In an example, the second and third representations are positionable based on a relative likelihood of the user to select the second and third representations.

Figure 8:
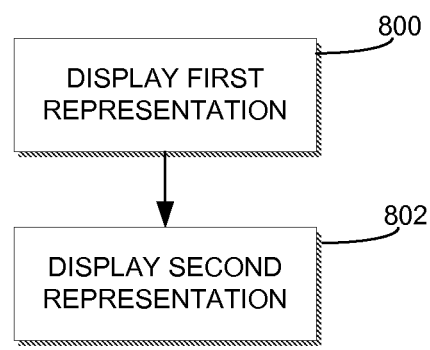
FIG. 8 is a flowchart for providing a user interface, such as for a mobile device.

FIG. 8 is a flowchart for providing a user interface, such as for a mobile device.

At 800, a representation of each of a subset of the plurality of functions is displayed, wherein each function of the subset is implementable upon selection of a representation corresponding to the function by a user.

At 802, the subset of the plurality of functions is generated based, at least in part, on a likelihood for each of the functions that the user will select a corresponding representation. In an example, the subset is displayed as dynamically generated. In an example, the corresponding likelihood for each function is based on at least one of: a consistency of selection of a function over time; an amount of use of the function per selection; and a minimum number of selections of the function. In an example, the subset is ordered for display of the representations based, at least in part, on a weight of the corresponding functions of the subset. In an example, the weight of each function is based on the corresponding likelihood and a user command to include the function in the subset.

In an example, the function includes at least one activity, and wherein the amount of use of the function is based, at least in part, on a number of times the at least one activity is performed per selection of the function. In an example, the minimum number of selections is normalized over time among the plurality of functions. In various examples, dynamically generating the subset includes periodically changing the functions of the subset based on a user interaction with the social network. In one such example, the social network is interacted with via the user interface of the mobile device and via a user interface of a computer.

In various examples, dynamically generating the subset includes removing a function from the subset based, at least in part, on the likelihood. In such an example, the minimum number of selections of the function is compared against a first threshold for adding the function to the subset and a second threshold higher than the first threshold for removing the function from the subset. In another such example, dynamically generating the subset includes removing the function from the subset further based, at least in part, on a user command to remove the function from the subset.

Figure 9:
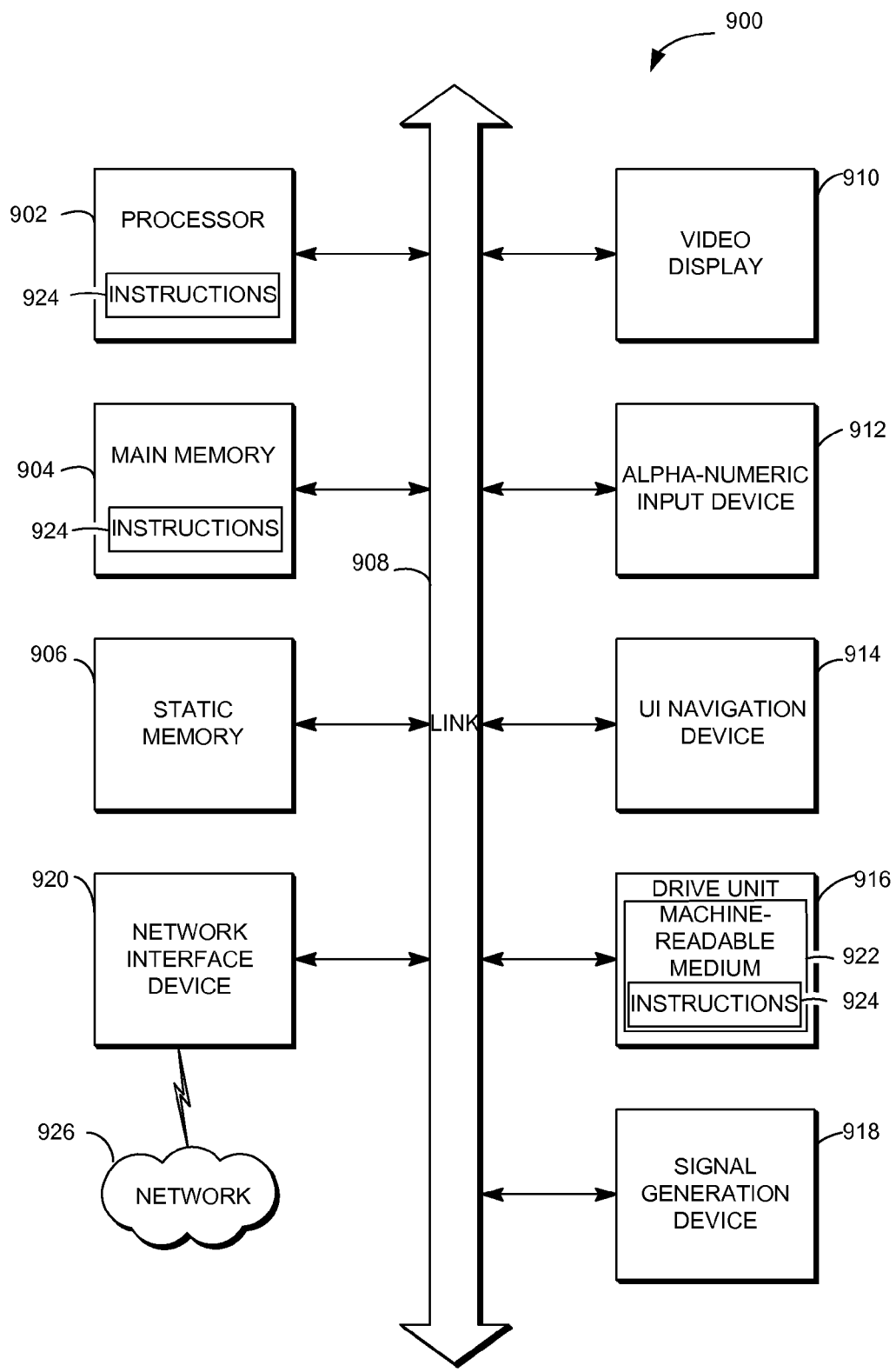
FIG. 9 is a block diagram illustrating components of a machine, according to some example embodiments, able to read instructions from a machine-readable medium.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system configured to provide a user interface on a mobile device for a social network having a plurality of functions, comprising:
    a display, configured to display a representation of each of a subset of the plurality of functions, wherein each function of the subset is implementable upon selection of a representation corresponding to the function by a user;
    a processor, configured to dynamically generate the subset of the plurality of functions based, at least in part, on a likelihood for each of the functions that the user will select a corresponding representation;
    wherein the display is configured to display the subset as dynamically generated;
    wherein the corresponding likelihood for each function is based on a minimum number of selections of the function;
    wherein the minimum number of selections is normalized based on an expected frequency of selection over time of each of the plurality of functions; and
    wherein the minimum number of selections is normalized by adjusting the minimum number of selections down from a baseline for functions of the plurality of functions that have a higher than average expected frequency and by adjusting the minimum number of selections up from the baseline for functions of the plurality of functions that have a lower than average expected frequency.

2. The system of claim 1, wherein the processor is configured to order the subset for display of the representations based, at least in part, on a weight of the corresponding functions of the subset.

3. The system of claim 2, wherein the weight of each function is based on the corresponding likelihood and a user command to include the function in the subset.

4. The system of claim 1, wherein the function includes at least one activity, wherein the corresponding likelihood for each function is further based on an amount of use of the function, and wherein the amount of use of the function is based, at least in part, on a number of times the at least one activity is performed per selection of the function.

5. The system of claim 1, wherein dynamically generating the subset includes removing a function from the subset based, at least in part, on the likelihood.

6. The system of claim 5, wherein the minimum number of selections of the function is compared against a first threshold for adding the function to the subset and a second threshold higher than the first threshold for removing the function from the subset.

7. The system of claim 6, wherein dynamically generating the subset includes removing the function from the subset further based, at least in part, on a user command to remove the function from the subset.

8. The system of claim 1, dynamically generating the subset includes periodically changing the functions of the subset based on a user interaction with the social network.

9. The system of claim 8, wherein the social network is interacted with via the user interface of the mobile device and via a user interface of a computer.

10. A non-transitory memory device, the memory device communicatively coupled to a processor and comprising instructions which, when performed on the processor, cause the processor to:
    display a representation of each of a subset of the plurality of functions, wherein each function of the subset is implementable upon selection of a representation corresponding to the function by a user;
    dynamically generate the subset of the plurality of functions based, at least in part, on a likelihood for each of the functions that the user will select a corresponding representation;
    wherein the subset is displayed as dynamically generated;
    wherein the corresponding likelihood for each function is based on a minimum number of selections of the function;
    wherein the minimum number of selections is normalized based on an expected frequency over time of each of the plurality of functions; and
    wherein the minimum number of selections is normalized by adjusting the minimum number of selections down from a baseline for functions of the plurality of functions that have a higher than average expected frequency and by adjusting the minimum number of selections up from the baseline for functions of the plurality of functions that have a lower than average expected frequency.

11. The memory device of claim 10, wherein the memory device is configured to order the subset for display of the representations based, at least in part, on a weight of the corresponding functions of the subset.

12. The memory device of claim 11, wherein the weight of each function is based on the corresponding likelihood and a user command to include the function in the subset.

13. The memory device of claim 10, wherein the function includes at least one activity, wherein the corresponding likelihood for each function is further based on an amount of use of the function, and wherein the amount of use of the function is based, at least in part, on a number of times the at least one activity is performed per selection of the function.

14. The memory device of claim 10, wherein dynamically generating the subset includes removing a function from the subset based, at least in part, on the likelihood.

15. The memory device of claim 14, wherein the minimum number of selections of the function is compared against a first threshold for adding the function to the subset and a second threshold higher than the first threshold for removing the function from the subset.

16. The memory device of claim 15, wherein dynamically generating the subset includes removing the function from the subset further based, at least in part, on a user command to remove the function from the subset.

17. The memory device of claim 10, dynamically generating the subset includes periodically changing the functions of the subset based on a user interaction with the social network.

18. The memory device of claim 17, wherein the social network is interacted with via the user interface of the mobile device and via a user interface of a computer.

19. A method, comprising:
  causing, with a processor, a user interface to display a representation of each of a subset of the plurality of functions, wherein each function of the subset is implementable upon selection of a representation corresponding to the function by a user;
  dynamically generating, with the processor, the subset of the plurality of functions based, at least in part, on a likelihood for each of the functions that the user will select a corresponding representation;
  wherein the subset is displayed as dynamically generated;
  wherein the corresponding likelihood for each function is based on a minimum number of selections of the function;
  wherein the minimum number of selections is normalized based on an expected frequency over time of each of the plurality of functions; and
  wherein the minimum number of selections is normalized by adjusting the minimum number of selections down from a baseline for functions of the plurality of functions that have a higher than average expected frequency and by adjusting the minimum number of selections up from the baseline for functions of the plurality of functions that have a lower than average expected frequency.

20. The method of claim 19, further comprising ordering the subset for display of the representations based, at least in part, on a weight of the corresponding functions of the subset.

21. The method of claim 20, wherein the weight of each function is based on the corresponding likelihood and a user command to include the function in the subset.

22. The method of claim 19, wherein the function includes at least one activity, wherein the corresponding likelihood for each function is further based on an amount of use of the function, and wherein the amount of use of the function is based, at least in part, on a number of times the at least one activity is performed per selection of the function.

* * * * *